United States Patent
Bruce et al.

(10) Patent No.: US 6,896,488 B2
(45) Date of Patent: May 24, 2005

(54) BOND COAT PROCESS FOR THERMAL BARRIER COATING

(75) Inventors: Robert William Bruce, Loveland, OH (US); Nripendra Nath Das, West Chester, OH (US); Thomas Edward Mantkowski, Madeira, OH (US)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 10/455,649

(22) Filed: Jun. 5, 2003

(65) Prior Publication Data

US 2005/0058547 A1    Mar. 17, 2005

(51) Int. Cl.[7] .................................................. F01D 5/14
(52) U.S. Cl. .................................. 416/241 R; 427/238
(58) Field of Search .................... 416/241 R; 427/238, 427/250, 252, 405; 428/679, 680, 660, 652, 428/681

(56) References Cited

U.S. PATENT DOCUMENTS

| 2,886,469 | A |   | 5/1959  | Fitzer            |
|-----------|---|---|---------|-------------------|
| 3,079,276 | A |   | 2/1963  | Puyear et al.     |
| 3,486,927 | A |   | 12/1969 | Gauje             |
| 3,978,251 | A |   | 8/1976  | Stetson et al.    |
| 4,004,047 | A |   | 1/1977  | Grisik            |
| 4,031,274 | A | * | 6/1977  | Bessen ........... 427/405 |
| 4,087,589 | A | * | 5/1978  | Bessen ........... 428/652 |
| 4,132,816 | A |   | 1/1979  | Benden et al.     |
| 4,148,275 | A |   | 4/1979  | Benden et al.     |
| 4,332,843 | A |   | 6/1982  | Ahuja             |
| 4,347,267 | A |   | 8/1982  | Baldi             |
| 4,382,976 | A |   | 5/1983  | Restall           |
| 4,687,684 | A |   | 8/1987  | Restall et al.    |
| 4,714,624 | A |   | 12/1987 | Naik              |
| 5,068,127 | A |   | 11/1991 | Fournes et al.    |
| 5,071,678 | A |   | 12/1991 | Grybowski et al.  |
| 5,217,757 | A |   | 6/1993  | Milianiak et al.  |
| 5,221,354 | A |   | 6/1993  | Rigney            |
| 5,264,245 | A |   | 11/1993 | Punola et al.     |
| 5,368,888 | A |   | 11/1994 | Rigney            |
| 5,407,704 | A |   | 4/1995  | Basta et al.      |
| 5,503,874 | A |   | 4/1996  | Ackerman et al.   |

(Continued)

Primary Examiner—F. Daniel Lopez
Assistant Examiner—Richard A. Edgar
(74) Attorney, Agent, or Firm—McNees Wallace & Nurick LLP

(57) ABSTRACT

A bond coat process for thermal barrier coatings. The method includes, after cleaning and masking the external surface of the substrate, first applying a layer of NiCrZr alloy to the external surface of the substrate using a sputter coat or other suitable process. Aluminum is then applied to the substrate, using either a vapor phase aluminization (VPA) or chemical vapor deposition (CVD) process, wherein aluminum diffuses into the NiCrZr alloy layer wherein a diffusion layer is formed by the aluminum with the substrate material on the internal surface of the substrate. The coated substrate may then be subjected to a heat treatment in a protective atmosphere to further allow diffusion of the aluminide into the NiAlCrZr diffusion layer. The substantially Al outer layers of the NiAlCrZr diffusion layer, and the diffusion aluminide layer, will provide an aluminum source for the surface, which will oxidize to form a tightly adherent aluminum scale. The diffusion aluminide layer and the high Al portion of the NiAlCrZr diffusion layer will also function as a source of aluminum which will provide a reservoir to heal the alumina scale during operation.

20 Claims, 2 Drawing Sheets

U.S. PATENT DOCUMENTS

| | | |
|---|---|---|
| 5,693,368 A | 12/1997 | Ackerman et al. |
| 5,780,106 A | 7/1998 | Connor |
| 5,928,725 A | 7/1999 | Howard et al. |
| 6,120,843 A | 9/2000 | Pillhoefer et al. |
| 6,146,696 A | 11/2000 | Das et al. |
| 6,156,123 A | 12/2000 | Pillhoefer et al. |
| 6,207,233 B1 | 3/2001 | Perry et al. |
| 6,224,941 B1 | 5/2001 | Chen et al. |
| 6,273,678 B1 | 8/2001 | Darolia |
| 6,283,714 B1 | 9/2001 | Rigney et al. |
| 6,296,447 B1 | 10/2001 | Rigney et al. |

* cited by examiner

BOND COAT PROCESS FOR THERMAL BARRIER COATING

FIELD OF THE INVENTION

The present invention is directed to a process for applying a bond coat and a diffusion aluminide to the surface of an aircraft engine component. More particularly, this invention relates to applying a complex multi-component bond coat formulation to the external surface and a diffusion aluminide coating to the internal surface of turbine engine components.

BACKGROUND OF THE INVENTION

The operating temperature within a gas turbine engine is both thermally and chemically hostile. Significant advances in high temperature capabilities have been achieved through the development of iron, nickel and cobalt-based superalloys and the use of oxidation-resistant environmental coatings capable of protecting superalloys from oxidation, hot corrosion, etc.

In the compressor portion of an aircraft gas turbine engine, atmospheric air is compressed to 10–25 times atmospheric pressure, and adiabatically heated to 800°–1250° F. in the process. This heated and compressed air is directed into a combustor, where it is mixed with fuel. The fuel is ignited, and the combustion process heats the gases to very high temperatures, in excess of 3000° F. These hot gases pass through the turbine, where rotating turbine wheels extract energy to drive the fan and compressor of the engine, and the exhaust system, where the gases supply thrust to propel the aircraft. To improve the efficiency of operation of the aircraft engine, combustion temperatures have been raised. Of course, as the combustion temperature is raised, steps must be taken to prevent thermal degradation of the materials forming the flow path for these hot combustion gases.

Every aircraft gas turbine engine has a so-called High Pressure Turbine (HPT) to drive its compressor. The HPT sits just behind the combustor in the engine layout and experiences the highest temperature and pressure levels (nominally 2400° F. and 300 psia respectively) developed in the engine. The HPT also operates at very high speeds (10,000 RPM for large turbofans, 50,000 for small helicopter engines). In order to meet life requirements at these levels of temperature and pressure, HPT's today are always air-cooled and constructed from advanced alloys.

While a straight turbojet engine will usually have only one turbine (an HPT), most engines today are of the turbofan or turboprop type and require one or two additional turbine(s) to drive a fan or a gearbox. This is called the Low Pressure Turbines (LPT) and immediately follows the HPT in the engine layout. Since substantial pressure drop occurs across the HPT, the LPT operates with a much less energetic fluid and will usually require several stages (usually up to six) to extract power.

Components formed from iron, nickel and cobalt-based superalloys cannot withstand long service exposures if located in certain sections of a gas turbine engine, such as the LPT and HPT sections. A common solution is to provide such components with an environmental coating that inhibits oxidation and hot corrosion and a thermal barrier coating to improve maximum operating temperature. Coating materials that have found wide use for this superalloy generally include diffusion aluminide coatings and thermal barrier coatings. The ceramic thermal barrier coatings (TBCs) are generally formed by such methods as physical vapor deposition (PVD). The diffusion aluminide coatings are generally formed by such methods as diffusing aluminum deposited by chemical vapor deposition (CVD) or slurry coating, or by a diffusion process such as pack cementation, above-pack, or vapor (gas) phase aluminide (VPA) deposition into a superalloy substrate. The diffusion aluminide coatings can serve as bond coats to promote adhesion of the TBCs and, with an alumina scale layer on the surface of the diffusion aluminide coating, can serve as diffusion barriers for the metals in the TBCs.

A diffusion aluminide coating generally has two distinct zones, the outermost of which is an additive layer containing an environmentally resistant intermetallic generally represented by MAl, where M is iron, nickel, or cobalt, depending on the substrate material. Beneath the additive layer is a diffusion zone comprising various intermetallic and metastable phases that form during the coating reaction as a result of diffusional gradient and changes in elemental solubility in the local regions of the substrate. During high temperature exposure in air, the outer surface of the additive layer forms a protective aluminum oxide (alumina) scale or layer that inhibits oxidation of the diffusion coating and the underlying substrate. Currently, many aircraft engine components, including HPT and LPT components are protected from the environment with TBCs. Greater performance is being sought for these systems to increase turbine temperature capability and improve reparability of components. However, TBC performance is limited by the thermal capability of diffusion aluminide coatings acting as bond coats. This limitation highlights the need for cost-effective processes to apply coatings with better thermal capabilities.

In addition to the limitations of TBC performance, turbine engine components with airfoils generally use film cooling in which relatively cooler air is forced though cooling passages in the components. These internal cooling passages do not require coatings in addition to the aluminide as the surfaces of such tubes are generally not exposed to the same high temperatures as the outer surfaces of the components. In addition, the internal surfaces are not accessible to many types of coating techniques, such as those employing line-of-sight deposition processes. The protective layer on the internal surfaces cannot be readily repaired, and therefore must last longer than the protective layer on the external surfaces, which can be refurbished. Additionally, the internal surfaces are subjected to a significantly different service environment than the external surfaces. The external surfaces experience hot corrosion, hot oxidation, and erosion in the combustion gas. On the other hand, a flow of bleed air from the engine compressor, not combustion gas, is passed through the internal passages, and the internal surfaces are at a lower temperature than the external surfaces. The bleed air typically may contain, salt, sulfur, and other corrodants drawn into the compressor of the engine. The presence of the combination of salt and sulfur at a temperature in the range of about 1300° F. (X° C.), a typical temperature for the internal surfaces, may lead to severe Type II corrosion on the internal surfaces. The internal surfaces are additionally subjected to low-to-medium temperature oxidation. The internal surfaces of the gas turbine components are thus subjected to environmental damage of a type substantially different from that experienced on the external surfaces.

What is needed is a modified bond coat with higher thermal capabilities that can be applied to an article with a low cost process, while simultaneously applying an aluminide coating to the internal surface of the article.

SUMMARY OF THE INVENTION

The present invention provides a TBC bond coat with higher thermal capabilities that can be applied to aircraft engine components that are coated with physical vapor deposition (PVD) TBCs.

The present invention is a process for applying a complex multi-component bond coat formulation to the external surface of a substrate and a vapor phase aluminide coating to the internal surface a substrate. The substrate is preferably a gas turbine engine component having internal cooling passages therein, such as the passages that channel a flow of cooling air through the component. The present approach allows the external surfaces of the component to be coated with a nickel aluminum chromium zirconium (NiAlCrZr) diffusion coating and also allows the internal surfaces to be coated with a diffusion aluminide coating. The present invention also includes an article manufactured with the process of the present invention.

The method includes, after cleaning and masking the external surface of the substrate, as required, first applying a layer of NiCrZr alloy to the external surface of the substrate using a sputter coat or other suitable process. Aluminum is then applied to the substrate, using either a vapor phase aluminization (VPA) or chemical vapor deposition (CVD) process, wherein aluminum diffuses into the applied NiCrZr alloy layer and wherein a diffusion layer is formed by the aluminum with the substrate material on the internal surface of the substrate. The coated substrate may then be subjected to a heat treatment in a protective atmosphere to further allow diffusion of the aluminide into the NiAlCrZr diffusion layer. The substantially Al outer layers of the NiAlCrZr diffusion layer, and the diffusion aluminide layer, will provide an aluminum source for the surface, which will oxidize to form a tightly adherent aluminum scale. The diffusion aluminide layer and the high Al portion of the NiAlCrZr diffusion layer will also function as a source of aluminum which will provide a reservoir to heal the alumina scale during operation.

An advantage of the present invention is that overlap between the coating on the external surface of the substrate and the coating on the internal surface of the substrate is eliminated, since aluminum is applied to both the external and internal surface of the substrate simultaneously.

Another advantage of the present invention is that the β-NiAlCrZr layer within the NiAlCrZr diffusion layer bond coat can withstand higher temperatures as compared to prior art bond coats. Also, the β-NiAlCrZr layer does not diffuse into the substrate the therefore preserves the composition of the substrate.

Another advantage of the present invention is that the method of applying the coatings of the present invention requires minimal masking of the substrate as the application of the coating of the external surface of the substrate is a two step process that does not require masking of the outer surface with alumina powder (or other maskant) when the internal surface of the substrate is aluminized.

A further advantage of the present invention is that the limited number of process steps minimizes labor and materials cost, resulting in a low cost bond coat.

Another advantage of the method of the present invention is that the outer layer of the bond coating is high in aluminum, providing an aluminum source for the formation of an alumina scale.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
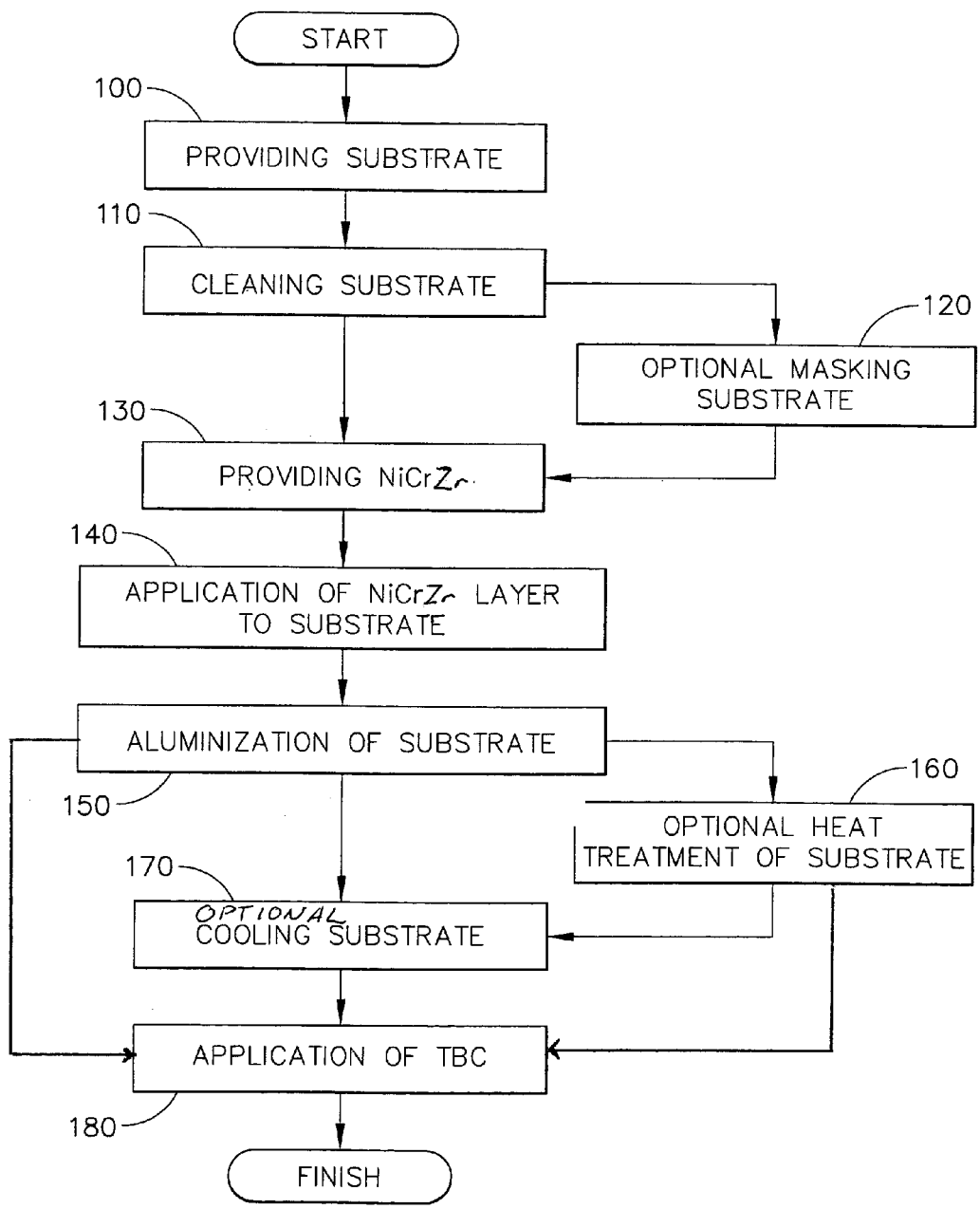
FIG. 1 is a process flow chart illustrating the method of applying the coatings of the present invention.

Referring now to FIG. 1 there is shown a flow chart of the method of the present invention for applying a NiAlCrZr diffusion coating to the external surface and a diffusion aluminide coating to the internal surface of a gas turbine component, at least a portion of which comprises a metallic substrate material having an internal passage therein defined by an internal surface, and an external surface. The initial step of the process 100 is the provision of a substrate having an internal passage therein defined by an internal surface, and an external surface. Optionally, some portions of the internal surface and/or external surface may be masked to prevent deposition of the subsequent NiCrZr or NiAlCrZr layer. Such masking is known to the art. In a preferred embodiment, the substrate has an internal passage therein defined by an internal surface, and an external surface. In a most preferred embodiment, the substrate is a gas turbine engine component having internal cooling passages therein defined by an internal surface, and an external airfoil surface. In a preferred embodiment, the metal is a superalloy selected from the group consisting of iron-base superalloys, cobalt-base superalloys, nickel-base superalloys and combinations thereof. The next step of the process 110 is cleaning both the internal surface(s) and the external surface(s) of the substrate to remove any dirt or other particles on the surface of the component.

The optional next step 120 of the process is masking any preselected external portions of the substrate where the NiAlCrZr is not desired or that would be adversely affected by the application of a NiAlCrZr coating with an alumina powder or other effective maskant. The next step of the process 130 is the provision of an alloy of NiCrZr. The NiCrZr alloy is placed in solution. In an alternative embodiment, the next step of the process 130 is the provision of an alloy of NiAlCrZr. The NiAlCrZr alloy is placed in solution. The next step of the process 140 is the application of a layer of NiCrZr of preselected thickness to the external surface of the substrate using a plating process as is known in the art. In an alternative embodiment, the layer of NiCrZr may be applied using a sputter coat process as known in the art. In a preferred embodiment, the thickness of the NiCrZr layer is in the range of about 0.001 inch to about 0.0035 inch. In a most preferred embodiment, the thickness of the NiCrZr layer is about 0.0025 inch. In an alternative embodiment, the step 140 may be the application of a NiAlCrZr alloy in order to require less deposition of aluminum during the subsequent aluminization step and to more control the amount of aluminum in the final NiAlCrZr layer and the aluminum content at a preselected depth. The NiCrZr layer may be graded, with more of the Cr or Zr element distributed toward the surface of the NiCrZr layer. Such a grading is achieved through the use of several coating steps, each step using different compositions of Cr and/or Zr. In an alternative embodiment, when the plated layer is a NiAlCrZr layer, the grading may be is achieved through the use of several plating steps, each step using different compositions of Al, Cr and/or Zr. Optionally, some portions of the internal surface and/or external surface may be masked after the deposition of the NiCrZr layer or NiAlCrZr layer to prevent deposition of aluminum during the subsequent aluminization step. Such masking is known to the art.

The next step of the process 150 is an aluminization step in which aluminum is deposited and diffused into the NiCrZr layer, creating a graded NiAlCrZr diffusion layer having a thickness in the range of about 0.001 inch to about 0.005 inch. Simultaneously, the aluminization step deposits a diffusion aluminide layer onto the internal surface of the component to a depth of diffusion in the range of about 0.0005 inch to about 0.003 inch. The grading of the NiAlCrZr, which creates several layers of differing compositions, is caused by the diffusion of the Al into the NiCrZr layer. More Al is present near the surface of the NiAlCrZr diffusion layer, while more Ni, Cr, and Zr is present near the surface of the substrate. As the Al diffuses into the NiCrZr layer, different NiAl phases form within the NiAlCrZr diffusion layer, with the Cr and Zr being substituted into the various NiAl matrices. In particular, a βNiAlCrZr layer forms at the surface of the substrate. An additional heat treatment step performed in a vacuum at a temperature in the range of about 1900° F. (1040° C.) to about 2050° F. (1210° C.) for a period of time in the range of about 2 hours to about 4 hours may be required to further diffuse the Al into the NiCrZr. In a preferred embodiment, the aluminization is performed with a VPA process at a temperature of about 1975° F. (1080° C.) for a period of time in the range of about 3 hours to about 9 hours, with the remaining VPA process parameters being well known in the art. In another preferred embodiment the aluminization will be performed with a CVD process, which takes place in a CVD chamber. Such aluminization of the substrate is well known in the art. In a preferred embodiment, the NiAlCrZr diffusion layer has a thickness of about 0.0015 to about 0.0035 inch and the depth of diffusion of the aluminide is about 0.0005 inch to about 0.003 inch.

The optional next step 160 of the process is an oxidative heat treatment step in which the substrate is heated in an oxygen-containing atmosphere to a preselected temperature for a preselected period of time to cause the formation of a substantially alumina scale on the surface of the NiAlCrZr diffusion layer on the external surface of the substrate and an alumina scale on the surface of the aluminide layer on the internal surface of the substrate. The Al present in high concentrations within the NiAlCrZr layer (if added in a separate operation) and near the surface of the NiAlCrZr layer serve as an aluminum reservoir to heal any loss of alumina during normal operations. In a preferred embodiment, the heat treatment is performed in a PVD chamber under partial oxygen pressure of about $10^{-3}$ in Bar, the preselected temperature is in the range of about 1830° F. (1000° C.) to about 2010° F. (1100° C.) and the preselected time is in the range of about 4 minutes to about 10 minutes. Such formation of oxide scale is well known in the art. The next step of the process 170 is optional cooling the substrate to ambient temperature. The final step of the process 180 is the application of a TBC layer to the external surface of the NiAlCrZr diffusion layer.

Figure 2:
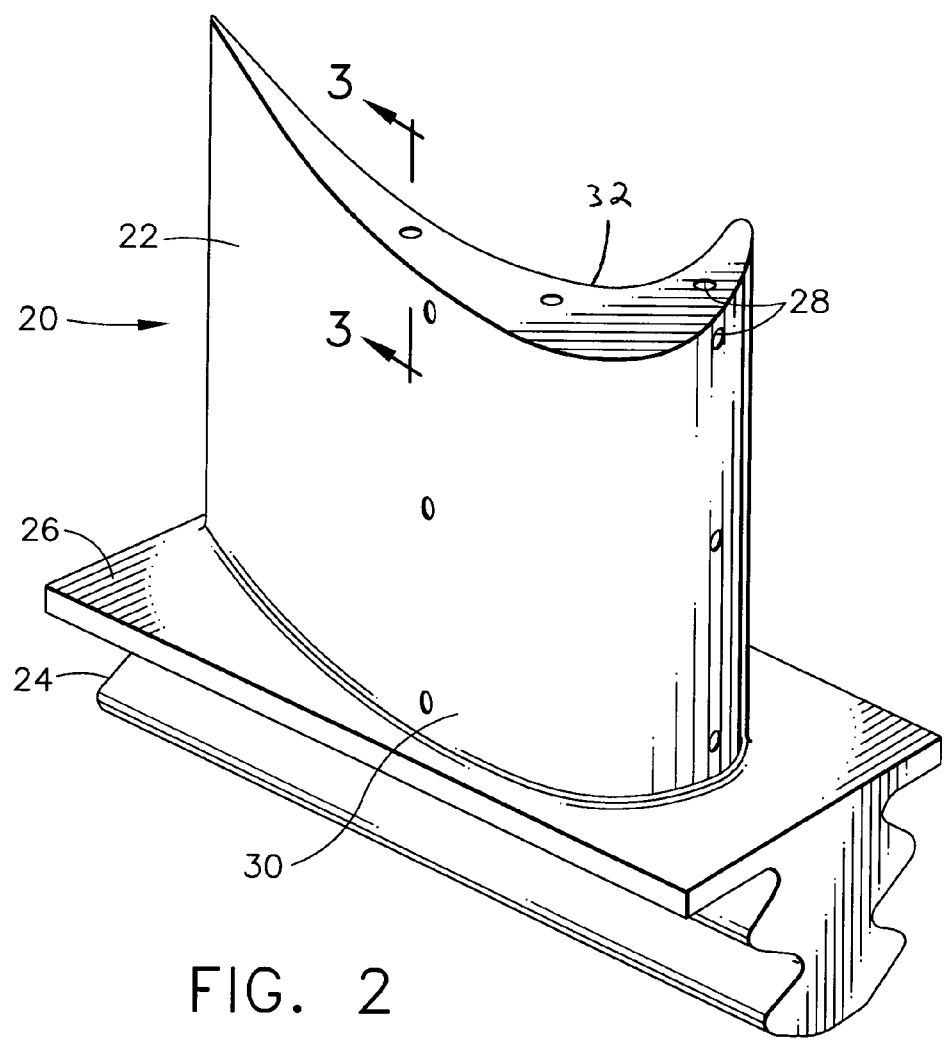
FIG. 2 is a perspective view of a turbine blade.

FIG. 2 depicts a component article of a gas turbine engine such as a turbine blade or turbine vane, and in this illustration a turbine blade 20 coated with the NiAlCrZr diffusion bond coat and diffusion aluminide layer prepared with the process of the present invention. The turbine blade 20 is formed of any operable material, and is preferably an iron, nickel or cobalt-base superalloy (or combinations thereof). The turbine blade 20 includes an airfoil 22 against which the flow of hot exhaust gas is directed. The turbine blade 20 is mounted to a turbine disk (not shown) by a dovetail 24 that extends downwardly from the airfoil 22 and engages a slot on the turbine disk. A platform 26 extends longitudinally outward from the area where the airfoil 22 is joined to the dovetail. A number of internal cooling passages extend through the internal of the airfoil 22, ending in openings 28 in the surface of the airfoil 22. A flow of cooling air is directed through the internal cooling passages, to reduce the temperature of the airfoil 22. The airfoil may be described as having a root end 30 adjacent to the dovetail 24, and an oppositely disposed tip end 32 remote from the dovetail 24.

Figure 3:
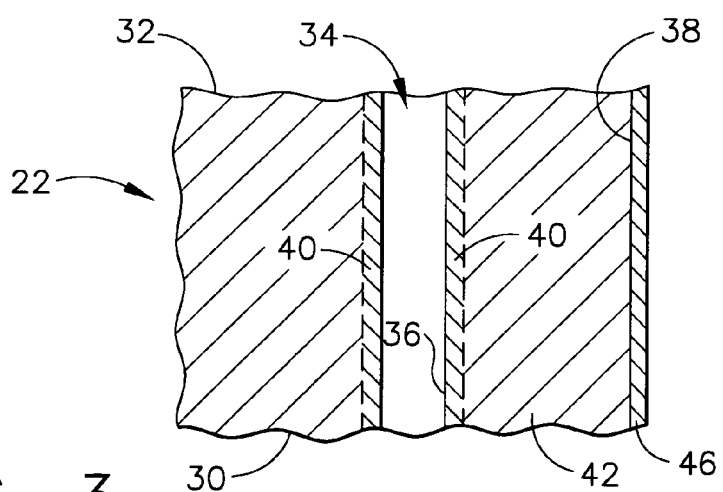
FIG. 3 is a cross-sectional view of a the turbine blade of FIG. 2 with a NiAlCrZr diffusion coating applied to the outer surface and a diffusion aluminide coating applied to the inner surface using the method of the present invention.

FIG. 3 is a longitudinal section through the airfoil 22, showing one of the internal cooling passages 34 extending through the airfoil 22. The internal cooling passage 34 has an internal surface 36, and there is also an external airfoil surface 38 of the metallic portion of the airfoil 22.

A diffusion aluminide protective layer 40 is formed on the internal airfoil surface 36. The diffusion aluminide is formed by diffusing aluminum into the passageways where it deposits onto the substrate material 42 of the airfoil 22. The aluminum is interdiffused with the material of the substrate 42 to form the aluminum-enriched protective layer 40 lying below the internal airfoil surface 36. The diffusion aluminide protective layer 40 has a composition with the aluminum concentration highest near the internal airfoil surface 36, and decreasing aluminum concentration with increasing distance from the internal airfoil surface 36. The diffusion aluminide protective layer 40 is typically from about 0.0005 inch to about 0.003 inch thick. When exposed to a high-temperature oxidizing environment, the aluminum-enriched layer at the internal airfoil surface 36 oxidizes to form a highly adherent alumina protective scale (not shown) at the internal airfoil surface 36, inhibiting and slowing further oxidation damage. The aluminum-enriched layer serves as a reservoir to heal any loss of aluminum during normal operation. A bond coat, such as discussed next and applied to the external airfoil surface 38 is not used and has not been applied on the internal airfoil surface 36.

A bond coat 46 overlies and contacts the external airfoil surface 38. The bond coat 46 is preferably a NiAlCrZr diffusion layer from about 0.0005 to about 0.005 inch thick. Such bond coats 46 are generally known in the art, although specific compositions may not be known. The aluminum is diffused into the bond coat during the diffusion treatment. A TBC (not shown) is generally deposited on top of bond coat 46 to provide additional thermal protection for the airfoil 22.

While the present invention has been described as a method for applying a bond coat and aluminide coating to a metal substrate generally, the present invention can be applied to any moderate temperature jet aircraft engine component surface along the gas flow path of the engine. For example, the bond coat and aluminide process of the present invention can be applied to the HPT and LPT engine components. The bond coat and aluminide process of the present invention allows an engine component to remain in similar service about twice as long as an engine component using a prior art platinum aluminide bond coat. The bond coat and aluminide process of the present invention allows an engine component to function at a temperature about 50° F. (30° C.) higher, from a baseline of about 2075° F. (1135° C.) than an engine component coated with the platinum aluminide bond coat and remain in service for about the same period of time as a platinum aluminide bond coat.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for applying a NiAlCrZr diffusion layer and a diffusion aluminide coating to a metal substrate comprising the steps of:
    providing a superalloy substrate, selected from the group consisting of iron-base superalloys, cobalt-base superalloys, nickel-base superalloys and combinations thereof, and having an internal passage therein defined by an internal surface, and an external surface;
    providing an alloy comprising nickel, chromium and zirconium;
    cleaning the external surface and the internal surface of the substrate;
    coating the external surface of the superalloy substrate with a layer of metal alloy comprising nickel, chromium and zirconium;
    aluminizing the external surface and the internal surface of the superalloy substrate, whereby a diffusion aluminide layer is formed on the internal surface and whereby the layer comprising nickel, chromium and zirconium becomes a NiAlCrZr diffusion layer; and
    cooling the substrate to room temperature.

2. The method of claim 1, further comprising the step of heating the superalloy substrate to a preselected temperature for a preselected period of time in an oxygen-containing atmosphere, thereby forming an alumina scale on the diffusion aluminide layer and a substantially alumina scale on the NiAlCrZr diffusion layer after the step of aluminization.

3. A high pressure turbine blade coated with a NiAlCrZr diffusion layer and a diffusion aluminide coating using the method of claim 2.

4. A low pressure turbine blade coated with a NiAlCrZr diffusion layer and a diffusion aluminide coating using the method of claim 2.

5. The method of claim 2, wherein the oxygen-containing atmosphere is substantially a vacuum with a partial oxygen atmosphere of about $10^{-3}$ mBar and the preselected time is in the range of about 4 to about 10 minutes.

6. The method of claim 1, wherein the alloy further comprises aluminum and the layer of metal alloy further comprises aluminum.

7. The method of claim 1, wherein the external surface of the superalloy substrate is coated using plating.

8. The method of claim 1, wherein the external surface of the superalloy substrate is coated using sputter coating.

9. The method of claim 1, wherein the layer of metal alloy has a thickness in the range of about 0.001 inch to about 0.0035 inch thick.

10. The method of claim 9, wherein the layer of metal alloy is about 0.0025 inch thick.

11. The method of claim 1 wherein the diffusion NiAlCrZr layer has a thickness in the range of about 0.001 inch to about 0.005 inch and the diffusion aluminide layer has a thickness in the range of about 0.0005 inch to about 0.003 inch.

12. The method of claim 11 wherein the diffusion NiAlCrZr layer has a thickness of about 0.003 inch.

13. The method of claim 1, wherein the diffusion NiAlCrZr layer comprises about 27 weight percent aluminum, about 12 weight percent chromium, about 1 weight percent zirconium with the balance being nickel.

14. The method of claim 13, further comprising the step of heating the superalloy substrate to a preselected temperature for a preselected period of time in an oxygen-containing atmosphere, thereby forming an alumina scale on the diffusion aluminide layer and a substantially alumina scale on the NiAlCrZr diffusion layer after the step of aluminization.

15. The method of claim 14, wherein the oxygen-containing atmosphere is substantially a vacuum with a partial oxygen atmosphere of about $10^{-3}$ mBar and the preselected time is in the range of about 4 to about 10 minutes.

16. The method of claim 13, wherein the alloy further comprises aluminum and the layer of metal alloy further comprises aluminum.

17. The method of claim 13, wherein the external surface of the superalloy substrate is coated using plating.

18. The method of claim 13, wherein the external surface of the superalloy substrate is coated using sputter coating.

19. The method of claim 13, wherein the layer of metal alloy has a thickness in the range of about 0.001 inch to about 0.0035 inch thick.

20. The method of claim 13 wherein the diffusion NiAlCrZr layer has a thickness of about 0.003 inch and the diffusion aluminide layer has a thickness in the range of about 0.0005 inch to about 0.003 inch.

* * * * *

UNITED STATES PATENT AND TRADEMARK OFFICE
CERTIFICATE OF CORRECTION

PATENT NO.   : 6,896,488 B2
DATED        : May 24, 2005
INVENTOR(S)  : Bruce et al.

It is certified that error appears in the above-identified patent and that said Letters Patent is hereby corrected as shown below:

Column 5,
Line 3, "be is achieved" should be -- be achieved --.
Line 56, "in Bar" should read -- mBar --.

Signed and Sealed this

Fourteenth Day of February, 2006

JON W. DUDAS
*Director of the United States Patent and Trademark Office*